United States Patent
Siegfriedsen

(10) Patent No.: US 8,624,412 B2
(45) Date of Patent: Jan. 7, 2014

(54) LOCKING DEVICE FOR THE ROTOR OF WIND TURBINES

(75) Inventor: Soenke Siegfriedsen, Rendsburg (DE)

(73) Assignee: Aerodyn Engineering GmbH, Rendsburg (DE)

( * ) Notice: Subject to any disclaimer, the term of this patent is extended or adjusted under 35 U.S.C. 154(b) by 153 days.

(21) Appl. No.: 13/132,505

(22) PCT Filed: Nov. 20, 2009

(86) PCT No.: PCT/DE2009/001662
§ 371 (c)(1),
(2), (4) Date: Jun. 2, 2011

(87) PCT Pub. No.: WO2010/072190
PCT Pub. Date: Jul. 1, 2010

(65) Prior Publication Data
US 2011/0316278 A1 Dec. 29, 2011

(30) Foreign Application Priority Data
Dec. 23, 2008 (DE) .......................... 10 2008 063 043

(51) Int. Cl.
*F03D 7/00* (2006.01)
(52) U.S. Cl.
USPC ............................................. 290/44; 290/55

(58) Field of Classification Search
USPC ..................................................... 290/44, 55
See application file for complete search history.

(56) References Cited

U.S. PATENT DOCUMENTS

2011/0250077 A1* 10/2011 Pedersen .................... 416/244 R

FOREIGN PATENT DOCUMENTS

| DE | 10351524 | 8/2004 |
| DE | 102004013624 | 10/2005 |
| DE | 102004017323 | 11/2005 |
| EP | 1925820 | 5/2008 |
| EP | 2148090 | 1/2010 |
| KR | 100821704 | 4/2008 |
| WO | WO 2005/0909780 | 9/2005 |

\* cited by examiner

*Primary Examiner* — Tho D Ta
(74) *Attorney, Agent, or Firm* — Diederiks & Whitelaw, PLC

(57) ABSTRACT

The invention relates to a wind turbine comprising a tower, a nacelle that is located on the tower and is provided with a machine support, a rotor shaft bearing and a generator, and comprising a rotor with a rotor shaft, a rotor hub and at least one rotor with at least one rotor blade that is fixed to the rotor hub. According to the invention, the wind turbine has a locking device established by a locking bolt that can be driven into a locking bolt recess in order to positively lock the rotor. The invention is characterized in that the locking bolt is located on the rotor hub and the locking recess is located on the nacelle.

9 Claims, 4 Drawing Sheets

LOCKING DEVICE FOR THE ROTOR OF WIND TURBINES

CROSS-REFERENCE TO RELATED APPLICATIONS

This application represents a National Stage application of PCT/DE2009/001662 entitled "Locking Device for the Rotor of Wind Turbines" filed Nov. 20, 2009, pending.

BACKGROUND OF THE INVENTION

1. Field of the Invention

The invention relates to a wind turbine comprising a tower, a nacelle that is located on the tower and a rotor that is connected to the nacelle and has a rotor shaft, a rotor hub and at least one rotor blade that is fixed to the rotor hub, the wind turbine having a locking device having a locking bolt that can be driven into a locking bolt recess in order to positively lock the rotor.

2. Discussion of the Prior Art

The positive locking of the rotor of a wind turbine is always necessary when it has to be guaranteed that a rotation of the rotor is ruled out, for example during repair and maintenance of wind turbines or when bringing the rotor into a parking position under extreme weather conditions.

A method for locking the rotor is known from DE 10 2004 013 624 A1. To this end, a disc is provided that is fixed concentrically to the rotor axis and is penetrated by at least one opening into which a locking bolt that extends parallel to the rotor axis and is supported on the frame construction of the wind turbine can be driven in preferably hydraulically and locks the rotor.

The disadvantage of this method and of the constructive design connected therewith is however that this implementation runs counter to the trend to more compact and lighter units. In particular in the case of wind turbines without a nacelle shroud the locking bolts that are arranged on the nacelle and can often be displaced hydraulically are directly exposed to the weather conditions, leading to a high susceptibility of this safety system due to the ingress of humidity and aerosols.

Integrating the locking bolt mechanism or hydraulics into the housing of the shroudless nacelle is not recommended on account of the risk that humidity and aerosols can also enter the components of the nacelle and can damage the nacelle.

A further disadvantage consists in the fact that securing the locking bolt mechanism to the nacelle is very complicated since large forces can arise in the connection area of locking bolt and nacelle that have to be transmitted in a very complicated manner into the housing and the support structure. In addition, also a large disc provided with several holes has to be introduced between the rotor shaft and the hub and as a very voluminous component complicates the assembly of a wind turbine.

SUMMARY OF THE INVENTION

It is therefore the object of the invention to provide a locking device for a wind turbine that is largely protected against direct exposure to the elements even in the case of wind turbines without a nacelle shroud. In accordance with the invention, this object is carried out by providing a wind turbine comprising: a tower, a nacelle located on the tower and provided with a machine support, a rotor shaft bearing and a generator, a rotor with a rotor shaft and a rotor hub, at least one rotor blade that is fixed to the rotor hub, a locking device including a locking bolt driven into a locking bolt recess in order to positively lock the rotor, said locking bolt being located on the rotor hub and the locking bolt recess is located on the nacelle.

According to the invention, the object is achieved by the wind turbine having the features of claim 1. The sub-claims specify advantageous embodiments of the invention.

BRIEF DESCRIPTION OF THE DRAWINGS

The invention is explained in more detail using a particularly preferred exemplary embodiment that is illustrated in the appended drawings. In the drawings.

DETAILED DESCRIPTION OF THE INVENTION

Figure 1:
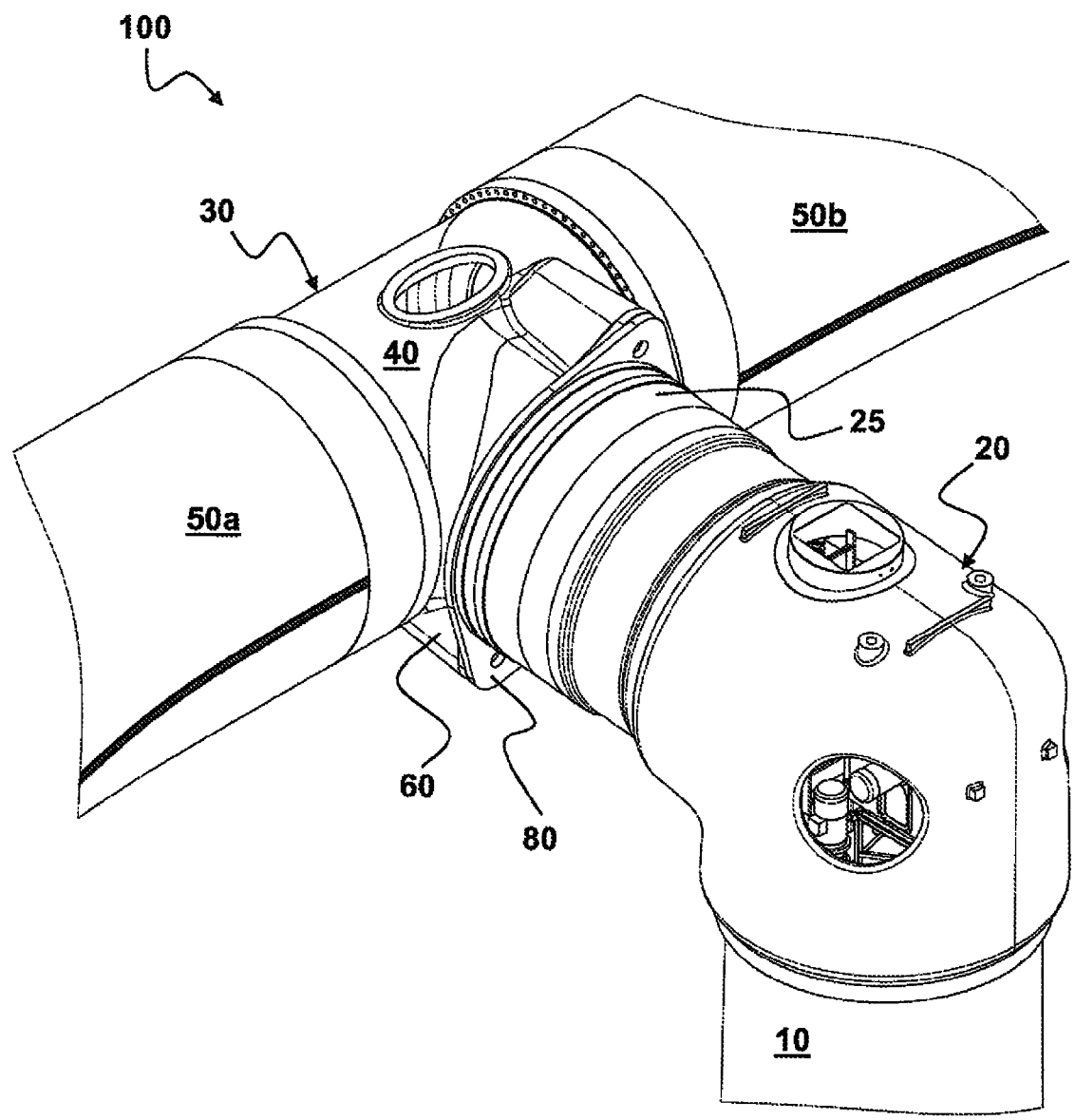
FIG. 1 shows a perspective view of an inventive wind turbine.

FIG. 1 shows a perspective view of an inventive wind turbine that is equipped with a double-bladed rotor in the illustrated example. The wind turbine 100 has a tower 10, a nacelle 20 that is located on the tower 10 and is provided with a machine support, a rotor shaft bearing and a generator, and comprising a rotor 30 with a rotor shaft, a rotor hub 40 and two rotor blades 50*a*, 50*b* that are fixed to the rotor hub 40.

Figure 2:
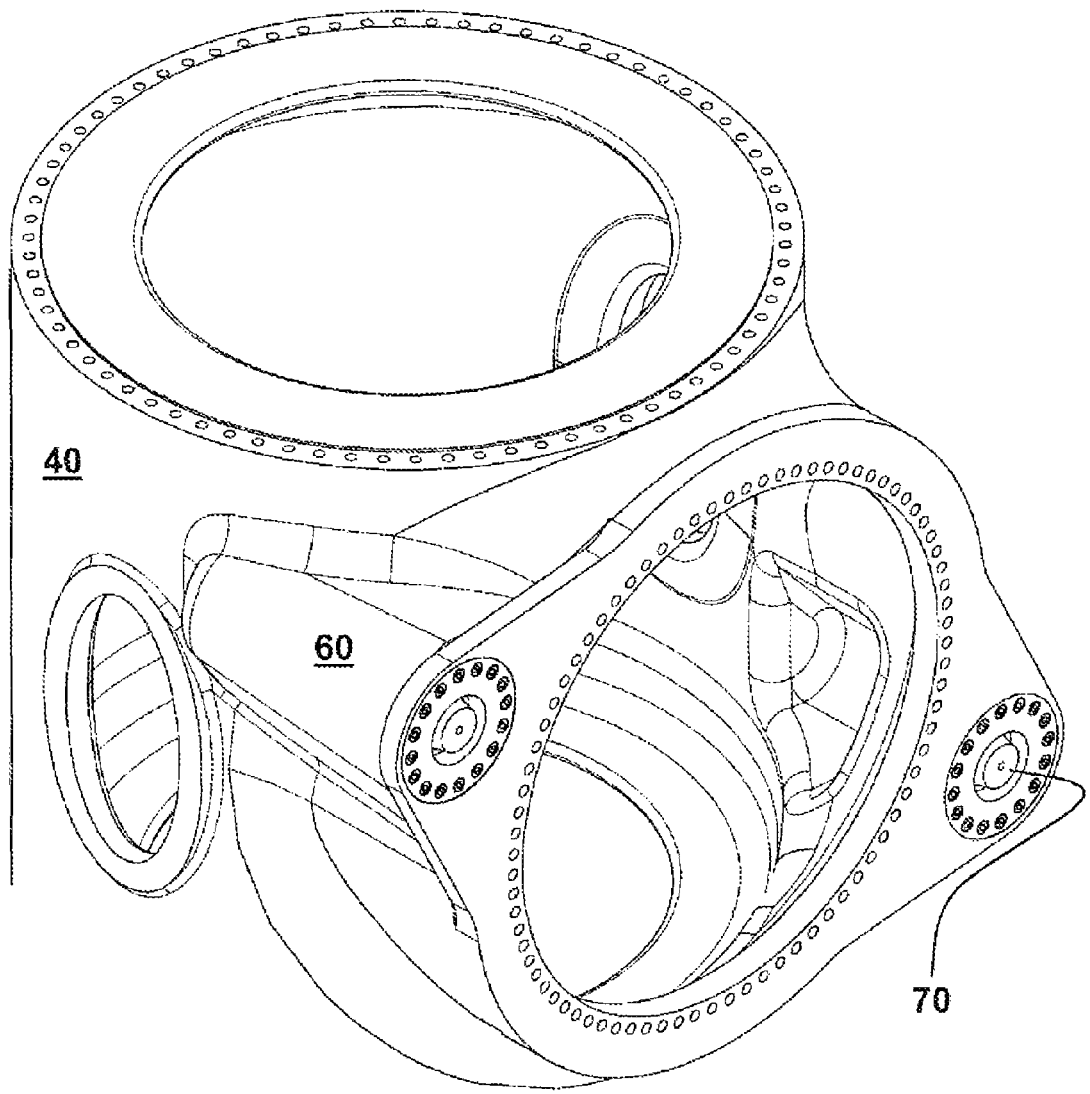
FIG. 2 shows a perspective view of the hub of the wind turbine shown in FIG. 1.
Figure 3:
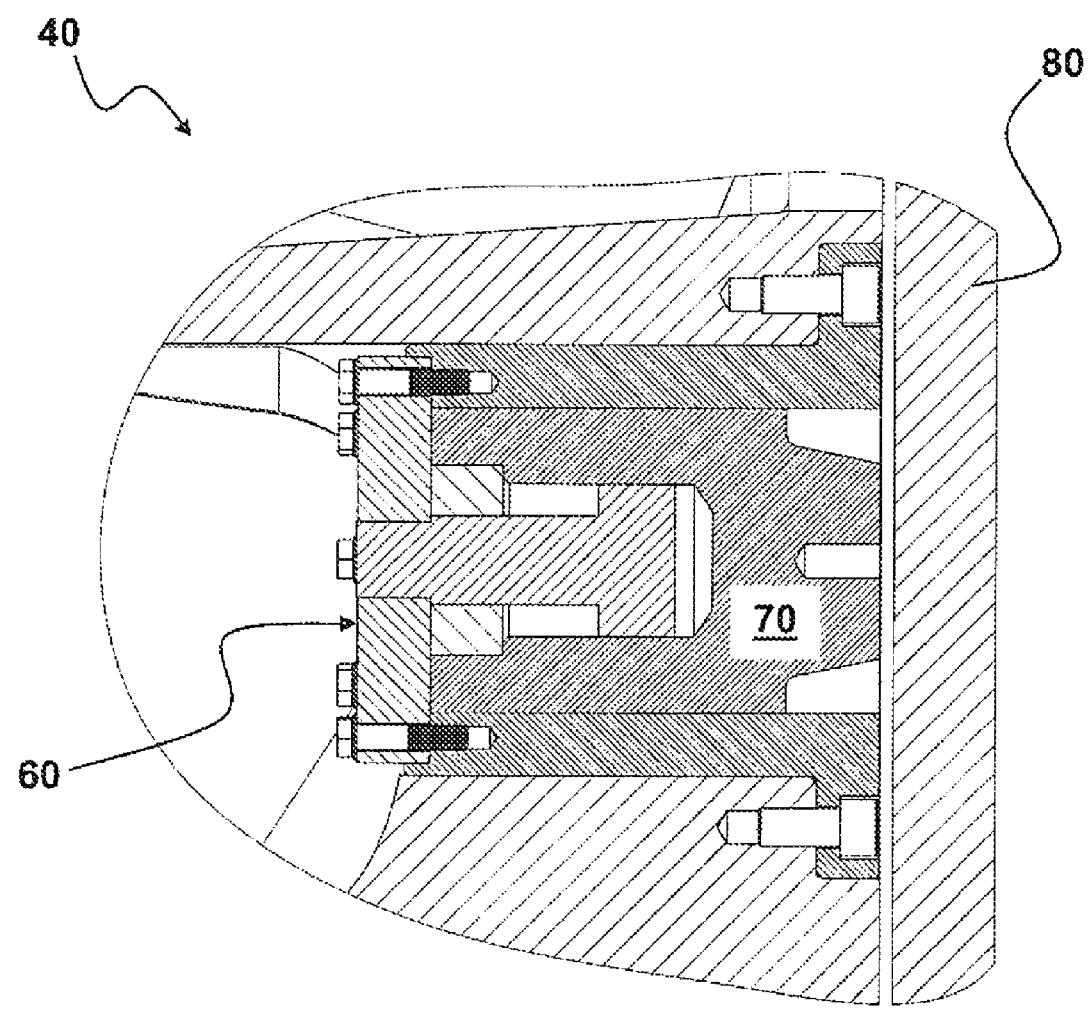
FIG. 3 shows a cut view of the hub with the locking device in a first position in which the rotor of the wind turbine can rotate freely.
Figure 4:
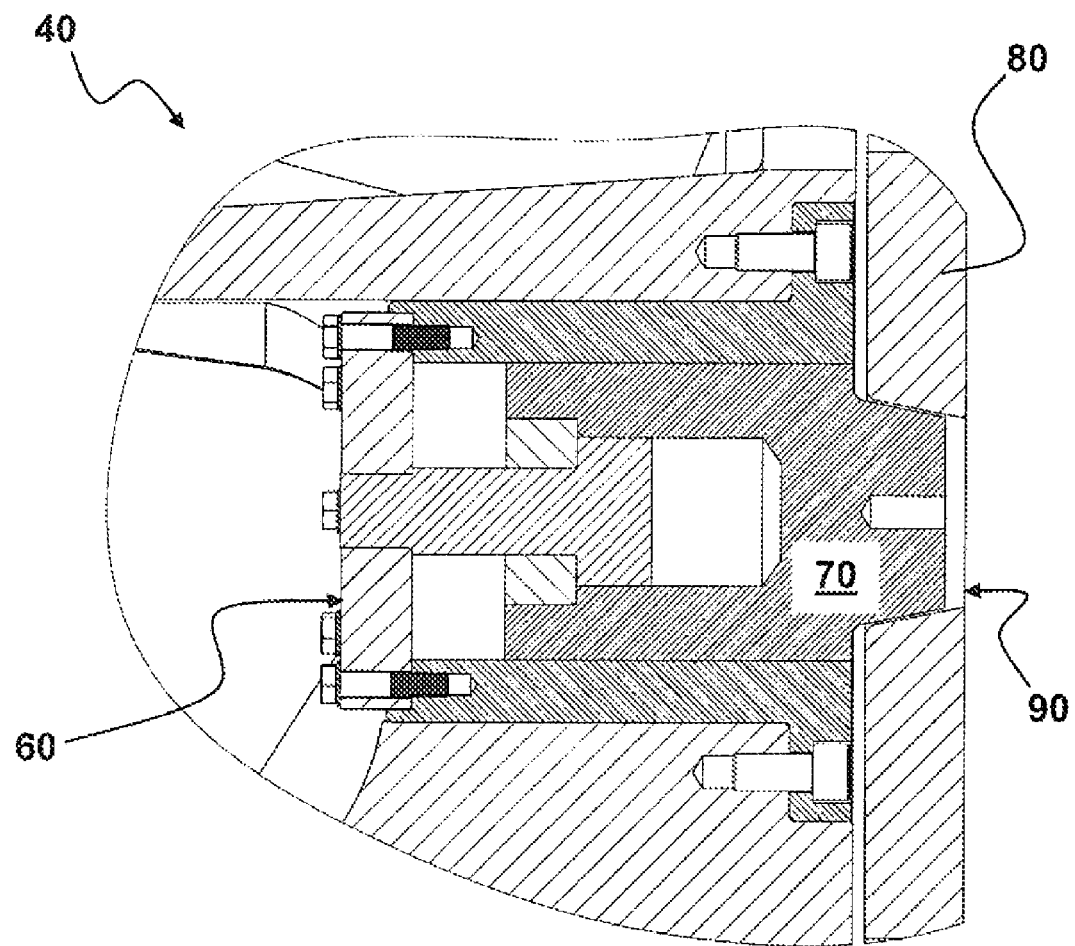
FIG. 4 shows a cut section of the hub with the locking device in a second position that locks the rotor of the wind turbine.

As can be seen from FIGS. 2, 3 and 4, according to the invention it is provided that at least one, preferably two locking bolts 70 are provided on the hub 40 of the rotor 30 and the locking bolt recess 90 on the nacelle 20. As a result, the locking bolt 70 is largely protected against exposure to the elements by the hub 40. The locking bolt recess 90 is likewise preferably designed—as shown—as a hole in the disc-shaped element 80 or (as an alternative) as a blind recess in the housing wall of the nacelle 20 so that in any case no opening has to be provided that leads into the interior of the nacelle 20.

By nacelle 20 it is here understood the unit placed on the tower 10 of the wind turbine 100 and consisting essentially of the rotor bearing, possibly a transmission and generator, the locking recesses 90 being provided in that section of the nacelle 20 that borders on the hub 40. This section can be the housing, for example the bearing housing of the rotor shaft bearing 25, or a special structure 80 fastened to the nacelle 20.

In the exemplary embodiment shown, the locking bolt recess 90 is actually designed in a disc-shaped element 80 that is fastened to the nacelle 20 and is preferably formed as a component of the rotor bearing housing 25.

The locking bolts 70 are preferably operated hydraulically, hydraulic actuating devices for adjusting the rotor blades 50*a*, 50*b* being usually provided anyway in the hub 40 with the result that the existing hydraulic systems can possibly also be used for displacing the hydraulic bolt 70 into the locking bolt recess 90 and out of it again.

So that the rotor 30 can be locked, it is necessary that the axis of the locking bolt 70 and the axis of the locking bolt recess 90 have an approximately flush orientation, when taking into account tolerances. To this end, a control system is provided which enables this position to be approached for example by a regulated braking of the rotor 30 into the locking position using a disc brake.

For safety reasons, a testing device is to be provided additionally that checks a target/actual comparison between the position approached by the control system and the actual position of locking bolt 70 and locking bolt recess 90. To prevent damage to the plant by extending the locking bolt 70 in a rotor position in which the axis of the locking bolt 70 and the axis of the locking bolt recess 90 do not coincide, when taking into account tolerances, the locking bolt 70 is only extended if the tested position actually corresponds to that position in which the locking bolt 70 can be safely introduced into the locking bolt recess 90.

Furthermore, more than one locking recess 90 can be provided that is arranged on the nacelle 20 or on the housing of the nacelle 20. The locking bolt recesses 90 are located on the circle that is drawn by the locking bolt 70 when the rotor 30 rotates and can be designed as blind openings of the housing of the nacelle 20 or as additional, preferably annular structural elements 80 fastened to the nacelle 20, other geometrical shapes of the recesses also being conceivable. For example, the locking bolt recesses 90 can be arranged as blind openings in the first section of the nacelle 20, bordering on the hub 40, that is to say the bearing housing of the rotor shaft bearing 25.

Finally it is also possible to provide more than one locking bolt 70 and one locking bolt recess 90, that is to say at least two locking bolts 70 and two locking bolt recesses 90.

FIGS. 3 and 4 finally show the geometric ratios in different rotor positions each in a sectional view through the hub 40. In FIG. 3, the hydraulic bolt 70 is retracted, so that the rotor 30 of the wind turbine 100 can rotate freely. In FIG. 4, the rotor 30 is in the locking position, the hydraulic bolt 70 being extended from the hub 40 into the locking bolt recess 90, so that the rotor 30 is locked and cannot rotate freely. To achieve effective positive locking, the locking bolt 70 is preferably designed as an outside cone and the locking recess 90 as a counterpart having an inside cone.

The invention claimed is:

1. A wind turbine comprising:
   a tower,
   a nacelle located on the tower, including an interior and provided with a machine support, a rotor shaft bearing and a generator,
   a rotor with a rotor shaft and a rotor hub,
   at least one rotor blade fixed to the rotor hub, and
   a locking device including a locking bolt driven into a locking bolt recess in order to positively lock the rotor, said locking bolt being located on the rotor hub and the locking bolt recess being located on the nacelle, wherein the locking bolt recess does not lead into the interior of the nacelle thereby providing the nacelle with protection against exposure to humidity and aerosols.

2. The wind turbine according to claim 1, characterized in that the locking bolt recess is arranged on a housing for the rotor shaft bearing.

3. The wind turbine according to claim 1, characterized in that the locking bolt is operated hydraulically.

4. The wind turbine according to claim 1, further comprising a control system for approaching a rotor position in which an axis of the locking bolt and an axis of the locking bolt recess are oriented approximately flush.

5. The wind turbine according to claim 1, further comprising a checking device for checking a position of the locking bolt and the locking bolt recess.

6. The wind turbine according to claim 1, characterized in that the locking bolt is designed as an outside cone and the locking bolt recess has a section designed as an inside cone.

7. The wind turbine according to claim 1, further comprising at least one further locking bolt recess.

8. The wind turbine according to claim 1, characterized in that at least two locking bolts and two locking bolt recesses are provided.

9. The wind turbine according to claim 1, wherein with the locking bolt, except for a portion configured to extend into the locking bolt recess, is completely located in the rotor hub so as to be protected against humidity and aerosols by the rotor hub.

* * * * *